United States Patent
Le

(10) Patent No.: US 7,026,008 B2
(45) Date of Patent: Apr. 11, 2006

(54) STABLE SUGAR-BASED HARD CANDY HAVING HIGH INDEX OF WHITENESS

(75) Inventor: Anh Si Le, Houston, TX (US)

(73) Assignee: SPI Polyols Inc., New Castle, DE (US)

( * ) Notice: Subject to any disclaimer, the term of this patent is extended or adjusted under 35 U.S.C. 154(b) by 547 days.

(21) Appl. No.: 10/243,300

(22) Filed: Sep. 13, 2002

(65) Prior Publication Data

US 2003/0113435 A1 Jun. 19, 2003

Related U.S. Application Data

(60) Provisional application No. 60/318,704, filed on Sep. 13, 2001.

(51) Int. Cl.
A23G 3/00 (2006.01)

(52) U.S. Cl. .................. 426/660; 426/103; 426/658; 426/548; 536/102; 536/103

(58) Field of Classification Search ............. 426/103, 426/660, 658, 548; 536/103, 102
See application file for complete search history.

(56) References Cited

U.S. PATENT DOCUMENTS

| | | | |
|---|---|---|---|
| 2,280,975 A | 4/1942 | Power | 260/635 |
| 4,248,895 A | 2/1981 | Stroz et al. | 426/3 |
| 4,279,931 A * | 7/1981 | Verwaerde et al. | 426/48 |
| 4,322,569 A | 3/1982 | Chao et al. | 568/863 |
| 4,445,938 A | 5/1984 | Verwaerde et al. | 127/29 |
| 4,528,206 A * | 7/1985 | Kastin | 426/660 |
| 5,314,701 A * | 5/1994 | Mentink et al. | 426/103 |
| 5,493,014 A * | 2/1996 | Caboche | 536/103 |
| 5,629,042 A | 5/1997 | Serpelloni et al. | 426/660 |
| 5,651,936 A * | 7/1997 | Reed et al. | 420/3 |
| 6,280,769 B1 * | 8/2001 | D'Amelia et al. | 424/464 |
| 6,444,250 B1 * | 9/2002 | Blankers et al. | 426/548 |
| 6,511,679 B1 * | 1/2003 | D'Amelia et al. | 424/464 |
| 6,780,990 B1 * | 8/2004 | Le | 536/102 |

FOREIGN PATENT DOCUMENTS

GB 526 839 9/1940

OTHER PUBLICATIONS

Patent Abstracts of Japan, vol. 16, No. 431 (C–983),Sep. 9, 1992 and JP 04 148661A (Nippon Shokuhin Kako), May 21, 1992.

* cited by examiner

*Primary Examiner*—N. Bhat
(74) *Attorney, Agent, or Firm*—Connolly Bove Lodge & Hutz LLP

(57) ABSTRACT

A stable hard-boiled candy prepared with sucrose, hydrogenated starch hydrolysate (HSH) and optionally 42 DE corn syrup. It is a preferred embodiment of the invention that the candy be produced without the use of a vacuum. The candy exhibits good stability characteristics in terms of reduced moisture absorption when exposed to humidity and temperature compared to candies prepared without HSH. Additionally, the candy has a high index of whiteness.

18 Claims, 7 Drawing Sheets

Figure 1:
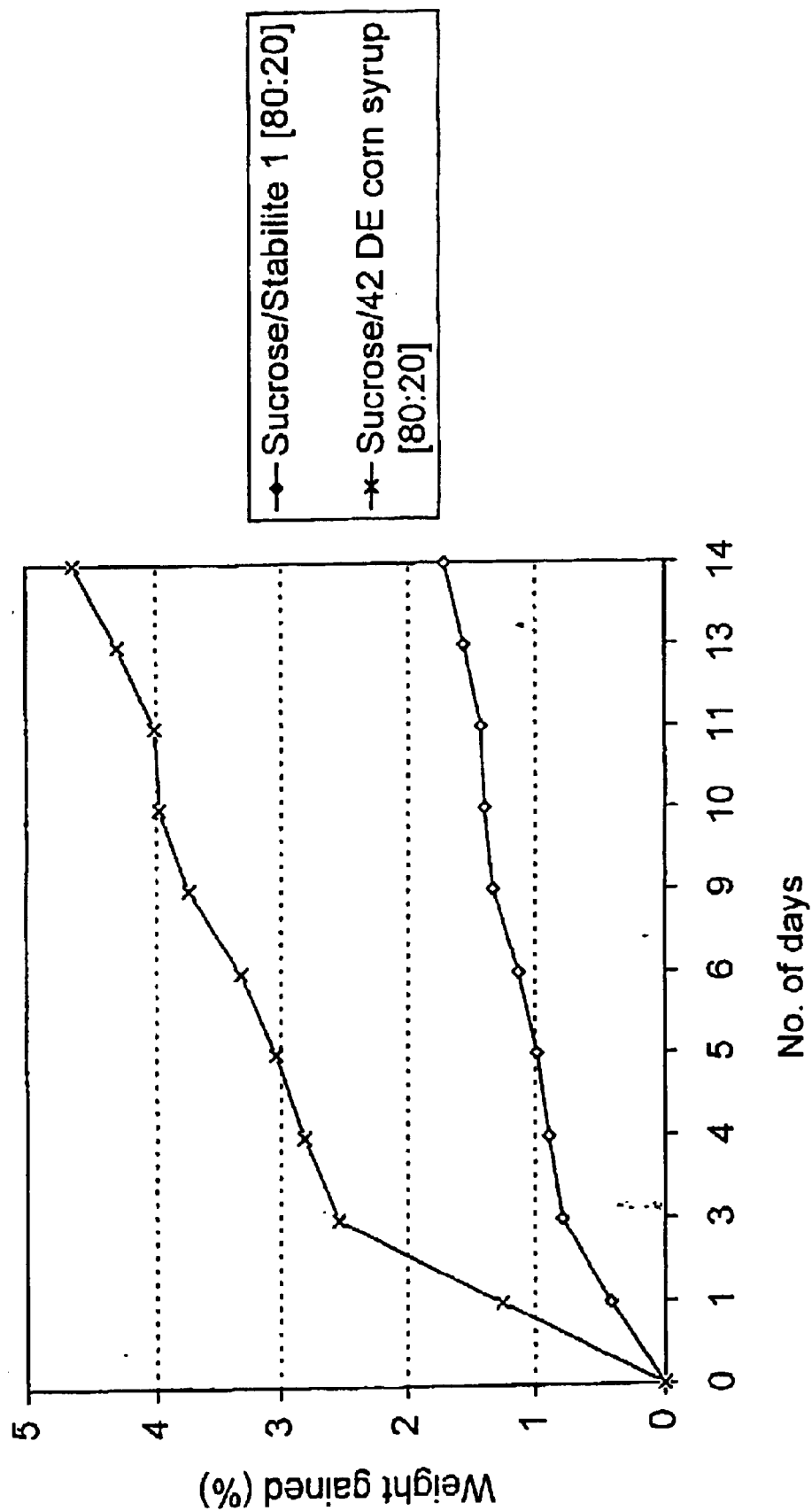

Comparison of the moisture absorption of hard-boiled candy samples in the 75% relative humidity chamber at 25 C Figure 1: Comparison of the moisture absorption of hard-boiled candy samples in the 75% relative humidity chamber at 25 C Figure 2: Comparison of the moisture absorption of hard-boiled candy samples in the 75% relative humidity at 37.8 C Figure 4: Comparison of the moisture absorption of hard-boiled candy samples in the 75% relative humidity at 37.8 C Figure 5: Comparison of the index of whiteness values of hard-boiled candy samples on the L a b plane Figure 6 : Comparison of the index of whiteness values of hard-boiled candy samples on the L a b plane Attached to this report is the information of the Hunter Color Scale Measurement that will help to define the degree of color difference.

Key:

L = 100 is the white color
L = 0 is the black color
-a = green
+a = red
+b = yellow
-b = blue

STABLE SUGAR-BASED HARD CANDY HAVING HIGH INDEX OF WHITENESS

CLAIM OF PRIORITY

Priority is claimed under 35 U.S.C. § 119(e) from the U.S. Provisional Application Ser. No. 60/318,704 filed on 13, Sep. 2001 which is herein incorporated by reference.

BACKGROUND OF THE INVENTION

The present invention relates to a stable hard-boiled candy containing sucrose, hydrogenated starch hydrolysate (HSH), and optionally corn syrup. This novel candy product is characterized by having a high index of whiteness and improved stability which is identified by a reduced moisture absorption.

Boiled sweets, commonly called hard sweets or hard boiled candies (hereinafter "hard-boiled sweets", "hard-boiled candies", "boiled sweets", or "candy"), are solid and essentially amorphous, i.e., glassy, confectionary products. They are obtained by extensive dehydration of carbohydrate syrups. Boiled sweets can be prepared using either or two methods: (1) casting or depositing; or (2) roping and stamping. Both of these techniques are well known in the art. Depositing is typically appropriate for syrups having a measured viscosity of less than 2,000 cps, while roping and stamping is suitable for syrups having higher viscosities. The principal market for boiled sweets currently consists of sugar products prepared from non-hydrogenated carbohydrate syrups.

Boiled sweets must be stable over time. They must have an adequate shelf-life which means that the appearance and mouth feel of the hard-boiled sweet varies as little as possible from the time when they are manufactured up to the time when they are consumed, so as to provide products which are visually attractive and also pleasant in the mouth. One major problem is that sugarless boiled sweets may become sticky during storage. Once wrapped, the stickiness makes it difficult or impossible to remove the wrapping materials before they are consumed. Alternatively, unwrapped boiled sweets may become bonded together or "caked" so that they cannot be easily separated. Another problem is that boiled sweets may become flowable and lose their shape during storage prior to consumption. Further, some or all of the components of the hard-boiled sweets can crystallize during storage and destroy the desired amorphous or glassy structure of the candy.

This problematic degradation towards a sticky and syrupy state due to moisture pickup or heat can be explained by surface phenomena and depth phenomena. The origin of surface phenomena is in the hygroscopic nature of boiled sweets. It is known that boiled sweets, which are essentially anhydrous products, have very low equilibrium relative humidities, substantially lower than the ambient relative humidities commonly found under normal storage conditions. This explains why an uptake of water necessarily occurs at the surface of the sweets as soon as they are exposed to air. When this water uptake is sufficiently high, it tends to liquify the surface of the sweets, which takes on the characteristics of a syrup and makes them sticky. The higher the water content of the boiled sweets, the quicker this phenomena occurs.

The depth phenomena have a thermal origin. When a boiled sweet is exposed to a temperature that is above the glass transition temperature ($T_g$) of the boiled sweet, the boiled sweet will become deformable and can even melt. To avoid the negative aspects of the depth phenomena, it is generally preferred that the storage temperature is below the glass transition temperature ($T_g$) of the boiled sweet. This preference is known in the art and is discussed in an article entitled "La transition vitreuse: incidences en technologic alimentaire" [Glass transition: incidents in food technology] by M. Le Meste and D. Simalos, published in I.A.A. of January/February (1990), which is hereby incorporated by reference. The glass transition temperature is the temperature at which, upon heating, a glassy and solid boiled sweet softens and eventually becomes a syrupy liquid. This temperature is normally measured by differential scanning calorimetry (DSC). However, it is also understood that a boiled sweet may be subject to a deformation, or even to a complete flow, when its storage temperature significantly exceeds its glass transition temperature. In such a case, the initially dry product becomes sticky. Furthermore, the higher the water content of the boiled sweet in question, the lower the glass transition temperature of the boiled sweet and the greater the risk of stickiness, deformation or flowing during the storage of the boiled sweet.

In addition to the stickiness and flow stability problems discussed above, boiled sweets have the tendency to crystallize in an uncontrolled manner during storage and thereby lose not only their very attractive glassy appearance but also their stability. The crystallization can occur either at the surface of the sweet or at the center of the sweet. The surface crystallization requires a significant water uptake. It also requires a sufficient concentration of crystallizable molecules in the liquefied peripheral layer. When these two conditions are met, crystallization is then observed which occurs from the surface of the sweet towards its center. This phenomenon, when it is uncontrolled, is known by the name of "turning." It renders the sweets completely opaque and, usually, white.

Alternatively, the crystallization of boiled sweets can also occur at the center of the candy if it is very high in water or if the storage temperature is very high. Under these conditions, the boiled sweet becomes excessively soft and can no longer be considered a real solid. The boiled sweet becomes more of a liquid supersaturated with crystallizable molecules whose variation toward a crystalline state is unavoidable and practically spontaneous. Specialists designate this type of crystallization by the term "graining". This phenomenon is particularly observed with sorbitol cast hard candies.

Whiteness in hard-boiled sweets is an important attribute for many applications. Hard-boiled sweets traditionally prepared with sucrose and corn syrup have a tendency to discolor or brown during cooking due to the hydrolysis of the sucrose and/or corn syrup. The use of HSH to prepare hard-boiled sweets, as specified below, was observed to reduce the browning of the boiled sweets. While the inventor does not wish to be bound to any particular theory, it is believed that the use of HSH to prepare boiled sweets prevents the sucrose from reducing. The resulting hard-boiled candy product prepared according to the invention has a higher index of whiteness compared to that of the prior art.

Figure 7:
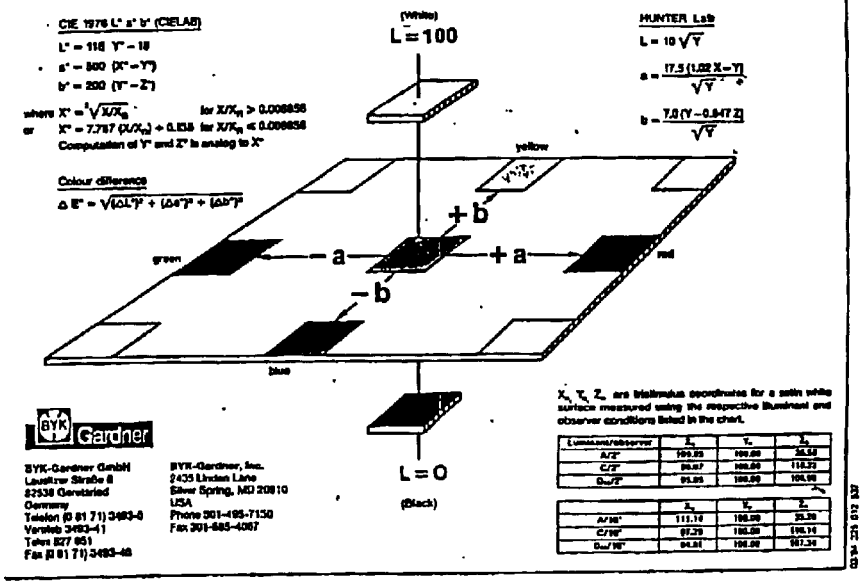

The index of whiteness of the invention and the prior art was measured on the L*a*b* plane using the Gardner's HANDY-COLOR™ Model No. 9200 (BYK-Gardner, Inc., Silver Spring, Md.). The L*a*b* system is shown in FIG. 7. From this Figure, it can be seen that on the L*a*b* plane, +L white, −L black, −a is green, +a is red, +b is yellow, and −b is blue. When using the HANDY-COLOR™ to measure the color of boiled sweets, it is desired to have higher "L" values, which indicates whiteness. Additionally, a lower, or preferably negative "b" values (indicating less yellow or a slight blueish tint) is desired, and a higher, albeit still negative, "a" value (indicating slight greenish tint) is also desired. The browning of sucrose-containing boiled sweets prepared without HSH can be identified by higher, positive "b" values (indicating yellowish tint) and higher, positive "a" values (indicating a red tint).

Sucrose (hereinafter "sugar" or "sucrose") provides sweetness and humectancy to food products during storage, as well as enhancing flavors and colors. In food applications, sucrose is commonly used in the form of a solution made by dissolving the crystalline materials in water. It is commonly known that sucrose will hydrolyze in solution from low pH to about pH 8.5 and at high temperatures to an equal molar mixture of glucose and fructose, called "invert sugar". Invert sugar is hygroscopic and is often used as a humectant in many food products such as cream fillings, cakes, soft cookies, and the like. Corn syrups can also be hydrolyzed under similar conditions. Invert sugar produced by the hydrolysis of sucrose causes browning or yellowing of the final product. This can be an unwanted side effect in many applications, notably, hard-boiled candies, where a white color is often preferred.

The aim of the present invention is to overcome the disadvantages of the prior art and to provide a new sucrose-sweetened boiled sweet which satisfies, much better than existing products, the expectations of confectionery manufacturers and the various requirements of practical use, that is to say the boiled sweet can be prepared at atmospheric pressure and exhibits excellent stability and whiteness properties. Existing methods of making sucrose-sweetened boiled sweets from a mixture of sucrose and corn syrups, which use high temperatures, e.g., 160° C. to 180° C., and do not use reduced pressure, i.e., a vacuum, have a tendency to produce finished products that are discolored. Therefore, confectioners would cook the mixture of sucrose and corn syrups at lower temperatures, e.g., from 148° C. to 154° C., and under a vacuum, e.g., 10 to 15 inches of mercury, to avoid the discoloration of the boiled sweet product. The finished boiled sweet would have a relatively high moisture content of 2 to 5 percent, and would be relatively stable. However, there exists a need to prepare sucrose-sweetened boiled sweets that do not discolor and exhibit good stability properties without resorting to the current method of preparation under vacuum. The present invention results in a stable, i.e., reduced hydroscopicity, boiled sweet that is prepared under normal atmospheric pressure and exhibits a high index of whiteness.

Maltodextrins are produced from the hydrolysis of starch. They generally have a dextrose equivalent (DE) between 1 and 20. The DE is a measurement of the reducing power of a starch hydrolysis product expressed as a percentage of the reducing power of the same weight of D-glucose. Although traditionally determined by titration, the DE may be determined by cryoscopy (depression of freezing point). The higher the DE, the lower the number average molecular weight of the product. The maximum possible DE is 100, i.e., pure dextrose. Maltodextrins are usually produced by the action of the enzyme α-amylase on gelatinised starch. Maltodextrin contains a range of nutritive non-sweet polysaccharides with a distribution of molecular weights where the anhydroglucose units are linked predominantly by 1,4 bonds. The commercial product is usually supplied as a free flowing spray-dried powder.

Hydrogenated maltodextrins (HMD) fall within a larger class of sweeteners known as hydrogenated starch hydrolysates (HSH). Hydrogenated starch hydrolysates include hydrogenated glucose syrups, maltitol syrups, and sorbitol syrups, and are a family of products found in a wide variety of foods. They serve a number of functional roles, including use as bulk sweeteners, viscosity or bodying agents, humectants, crystallization modifiers, cryoprotectants and rehydration aids. They also can serve as sugar-free carriers for flavors, colors and enzymes.

Hydrogenated starch hydrolysates are produced by the partial hydrolysis of corn, wheat, or potato starch with the subsequent hydrogenation of the hydrolysate at high temperature under pressure. The end product is an ingredient composed of sorbitol, maltitol, and higher hydrogenated saccharides. By varying the conditions and extent of the hydrolysis, the relative occurrence of various mono-, di-, oligo- and polymeric hydrogenated saccharides in the resulting product can be obtained. Therefore, a wide range of polyols that can satisfy varied requirements with respect to different levels of sweetness, viscosity and humectancy can be produced.

Hydrogenated mono-, di-, oligo- and poly-saccharides are characterized by the degree of polymerization (DP) after hydrogenation. Hydrogenated monosaccharides have a DP=1. Hydrogenated disaccharides have a DP=2. Hydrogenated tri-, quat-, penta-, hexa-, hepta-, octa-, nona-, and deca-saccharides have DPs of 3, 4, 5, 6, 7, 8, 9, and 10, respectively. Hydrogenated undeca- and greater saccharides have DPs of 11 or greater. The DP may be determined by routine HPLC analysis.

Generally, the term hydrogenated starch hydrolysate can correctly be applied to any polyol produced by the hydrogenation of the saccharide products of starch hydrolysis. In practice, however, certain polyols such as sorbitol, mannitol, and maltitol are referred to by their common chemical names. The term "hydrogenated starch hydrolysate" is more commonly used to describe the broad group of polyols that contain substantial quantities of hydrogenated oligo- and poly-saccharides in addition to any monomeric (such as sorbitol and mannitol) or dimeric (such as maltitol) polyols.

U.S. Pat. No. 5,629,042 to Serpelloni et al., which is hereby incorporated by reference, discloses a sugarless boiled sweet containing a water crystallizable polyol and carbohydrates, e.g., saccharides. The boiled sweet has a water content greater than three percent and a glass transition temperature greater than or equal to 38° C., the glass transition temperature ($T_g$) being measured at a water content of about 3.2 percent.

U.S. Pat. No. 4,248,945 to Stroz et al., which is hereby incorporated by reference, shows hydrogenated starch hydrolysates having total solids contents of about 72 to 80 weight percent. Based on the dry hydrogenated starch hydrolysates, the total solids contents consist of about 4 to 20 weight percent sorbitol (hydrogenated monosaccharide), 20 to 65 weight percent hydrogenated disaccharides (e.g., maltitol), 15 to 45 weight percent tri- to hepta-hydrogenated oligosaccharides, and 10 to 35 weight percent hydrogenated polysaccharides higher than hepta.

U.S. Pat. No. 4,445,938 to Verwaerde et al., which is hereby incorporated by reference, discloses dry hydrogenated starch hydrolysates consisting of, based on total solids content, less than 14 weight percent of hydrogenated monosaccharides, e.g., sorbitol, less than 35 weight percent of hydrogenated disaccharides, e.g., maltitol, 12 to 18 weight percent of hydrogenated trisaccharides, between 42 and 70 weight percent of hydrogenated quat- to deca-oligosaccharides, and less than 32 weight percent of hydrogenated polysaccharides greater than deca. The Verwaerde composition provides a more stable hydrogenated starch hydrolysate than one which has 15.5 or 30.0 weight percent of hydrogenated quat- to deca-oligosaccharides.

U.S. patent application Ser. No. 09/276,014 by Le (hereinafter "Le"), which is hereby incorporated by reference in its entirety, discloses hydrogenated starch hydrolysates. The HSH prepared according to Le is used in the preparation of the present invention.

When the hydrogenated starch hydrolysate syrups that are presently on the market (e.g., HYSTAR 3375 from Lonza, now SPI Polyols, New Castle, Del. and RA 1000 from Roquette Freres, Lestrem, France) are used to produce hard boiled candies or sweets, the candies or sweets are relatively unstable at high storage temperatures and/or high water contents, which can result in a sticky candy or sweet as explained below. Accordingly, the inventors have surprisingly found that the HSH used in the present invention satisfies a long-felt need by providing a new hydrogenated starch hydrolysate which can be used to prepare hard boiled candies that are stable at high temperatures and high water contents and absorb little moisture in humid conditions.

The inventor has observed that the use of HSH to prepare hard-boiled sweets reduces the hygroscopicity of the boiled sweet, in that the candies produced with HSH do not absorb as much moisture as candies made using only corn syrup and sucrose. FIGS. 1, 2, 3, and 4 show plots of the weight gain of the candy, which evidences the moisture absorption, against the number of days the candy is stored. These plots show that the boiled sweets prepared with HSH absorb significantly less moisture compared to candies prepared using only corn syrup and sucrose. The inventor notes that the reduced moisture absorption does not prevent the surface crystallization of sucrose, but it does reduce the stickiness of the candies. Therefore, the inventor has found that hard candies prepared using HSH as described herein have superior stability properties in terms of reduced moisture absorption, hence, reduced stickiness, when exposed to at 75 percent relative humidity at temperatures from about 25° C. to about 37.8° C.

SUMMARY OF THE INVENTION

The objective of the invention is to use hydrogenated starch hydrolysate (HSH), for example STABILITE™ 1 (a product of SPI Polyols, Inc., New Castle, Del.), to prepare stable sugar-based hard-boiled candies exhibiting a high index of whiteness. It is an object of the present invention that the hard-boiled candies have a high index of whiteness and are stable. It is a further object of the invention to prepare the hard boiled candies at atmospheric pressures.

LIST OF FIGURES

FIG. 1. Comparison of the moisture absorption of hard-boiled candy samples [80:20] in the 75% relative humidity chamber at 25° C.

Figure 2:
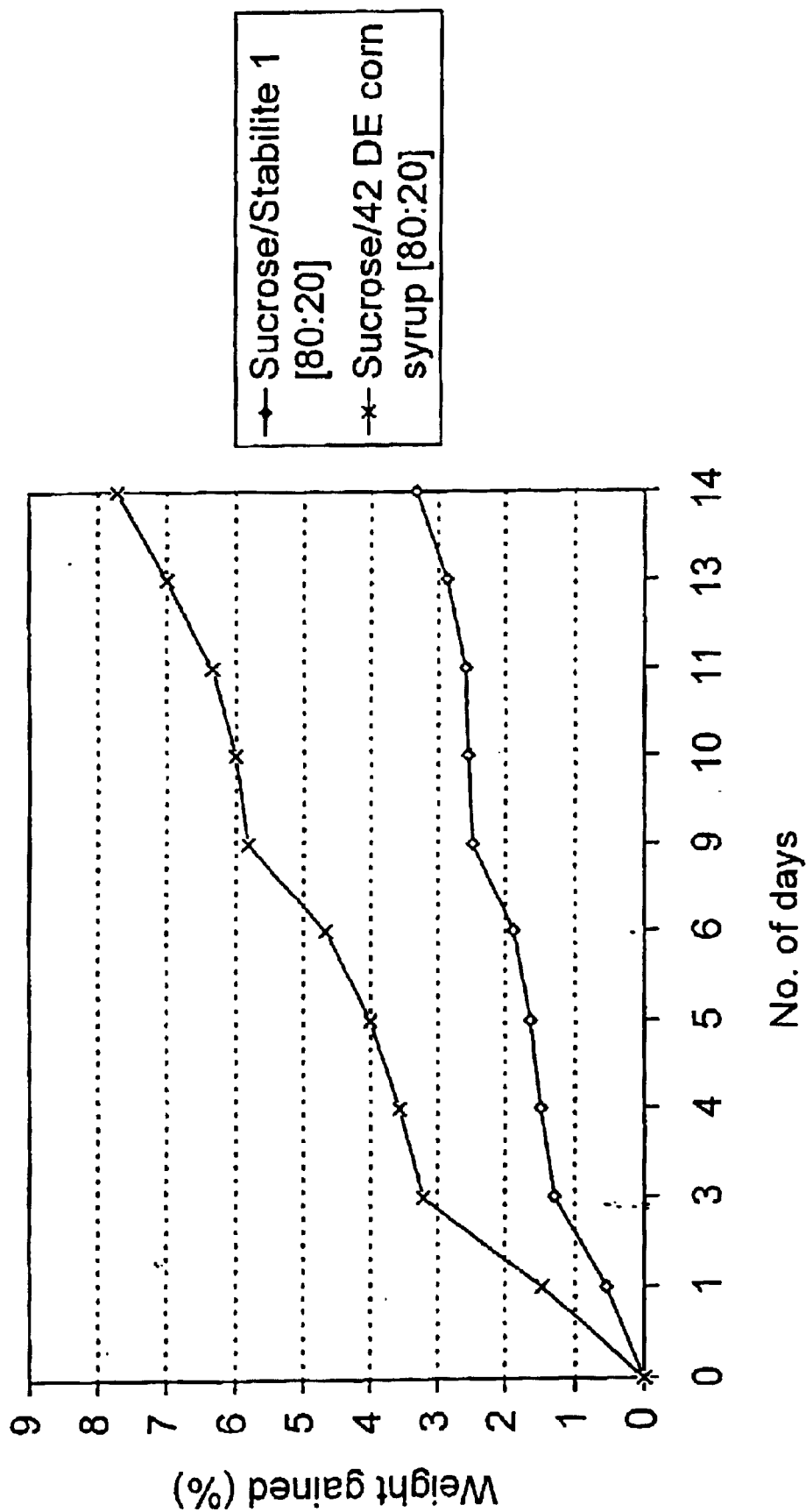

FIG. 2. Comparison of the moisture absorption of hard-boiled candy samples [80:20] in the 75% relative humidity chamber at 37.8° C.

Figure 3:
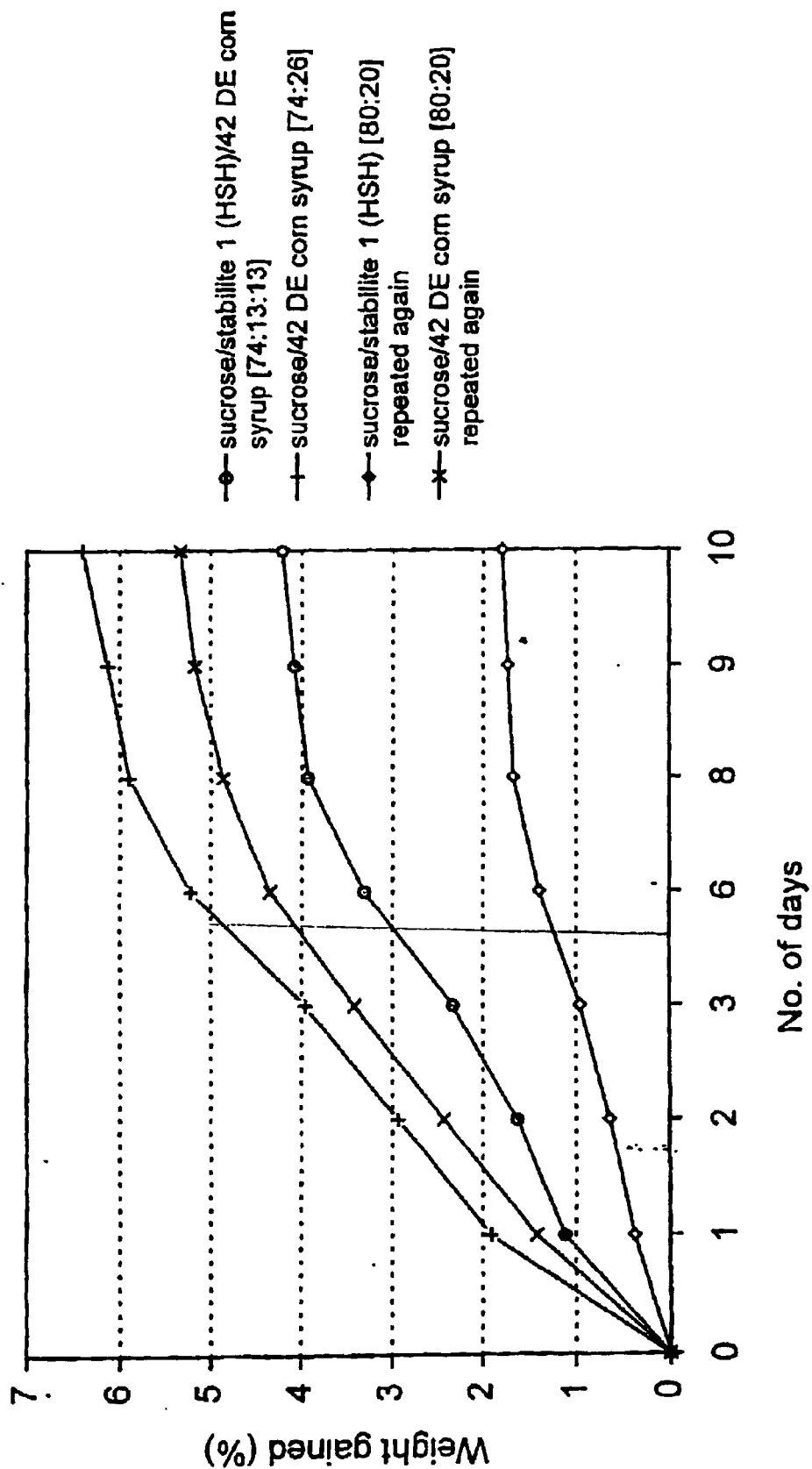

FIG. 3. Comparison of the moisture absorption of hard-boiled candy samples [74:13:13, 74:26, and 80:20] in the 75% relative humidity chamber at 25° C.

Figure 4:
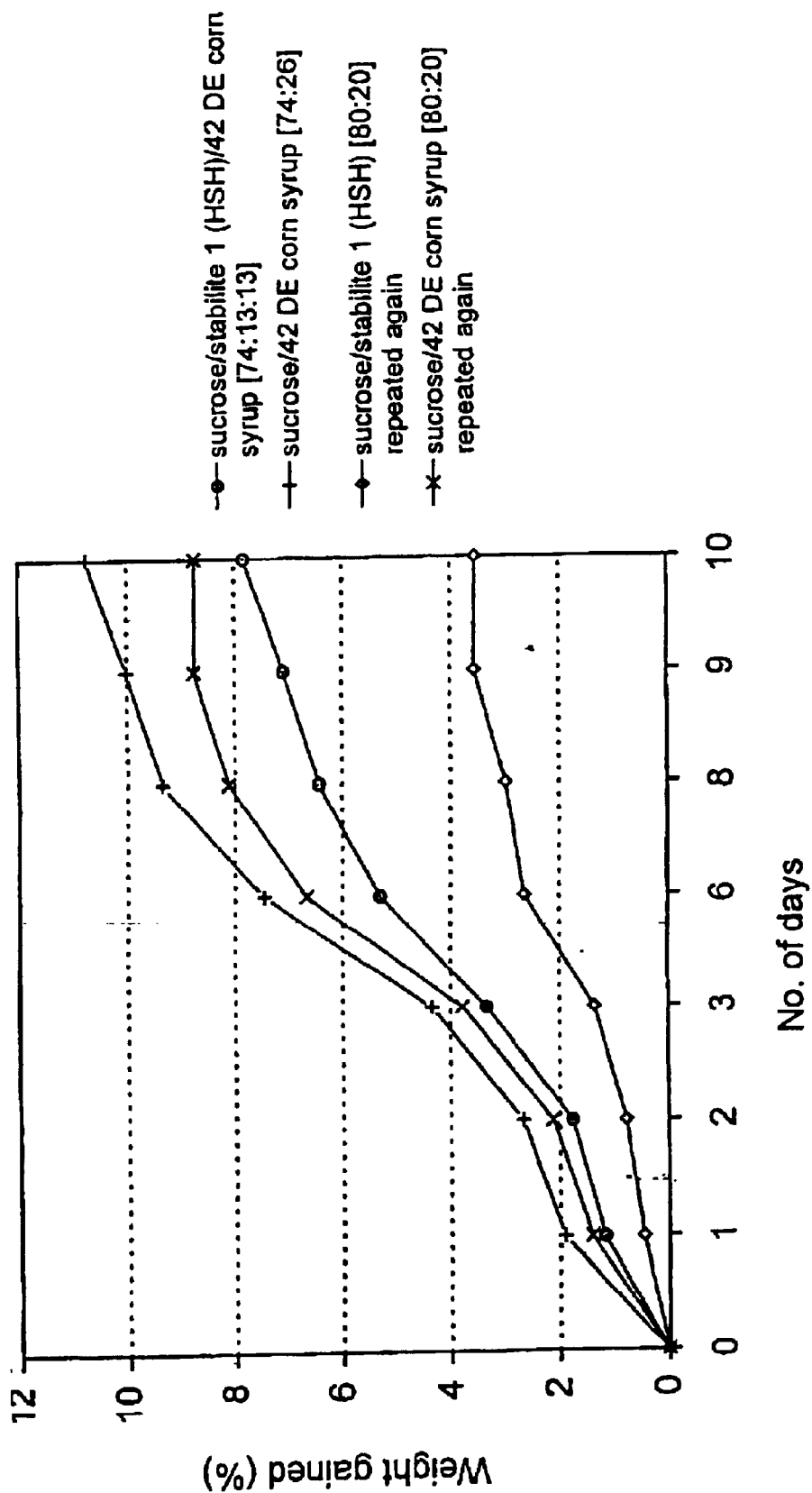

FIG. 4. Comparison of the moisture absorption of hard-boiled candy samples [74:13:13, 74:26, and 80:20] in the 75% relative humidity chamber at 37.8° C.

Figure 5:
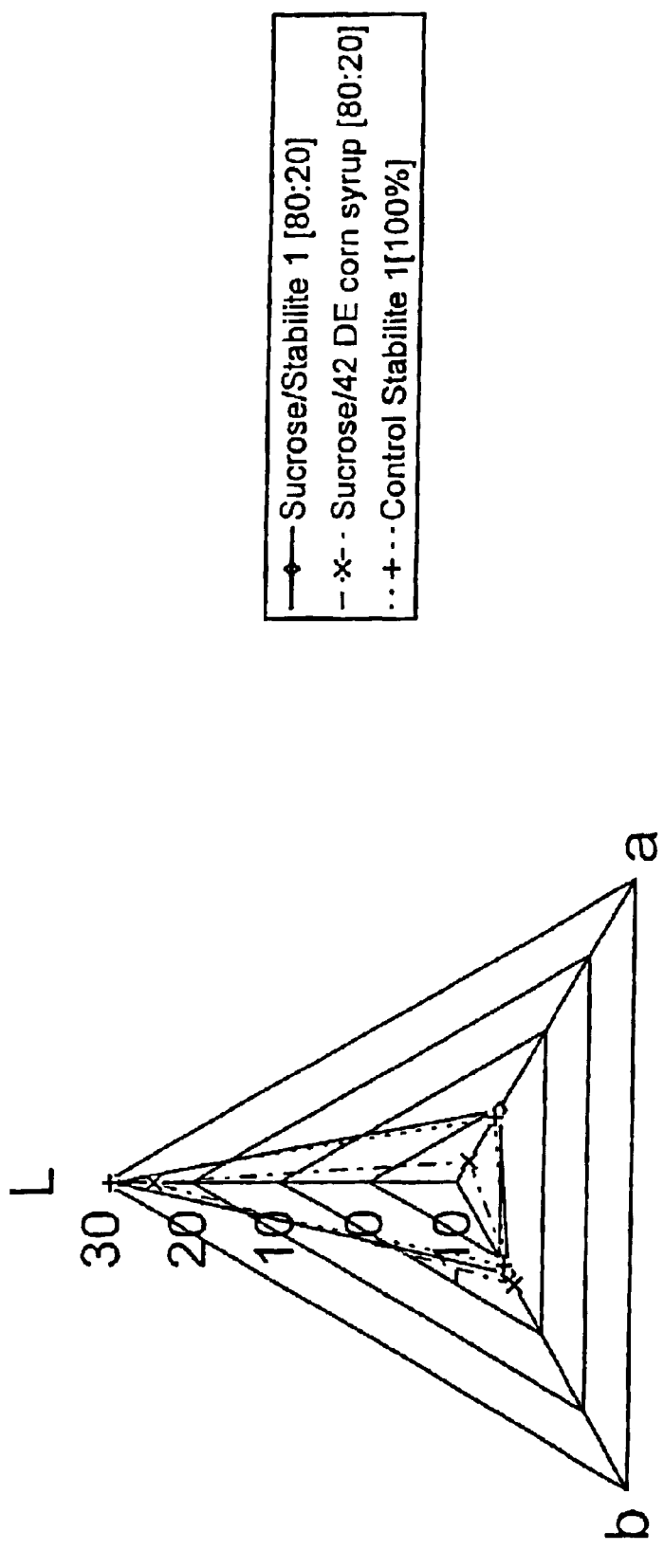

FIG. 5. Comparison of the index of whiteness values of hard-boiled candy samples [80:20] on the L a b plane.

Figure 6:
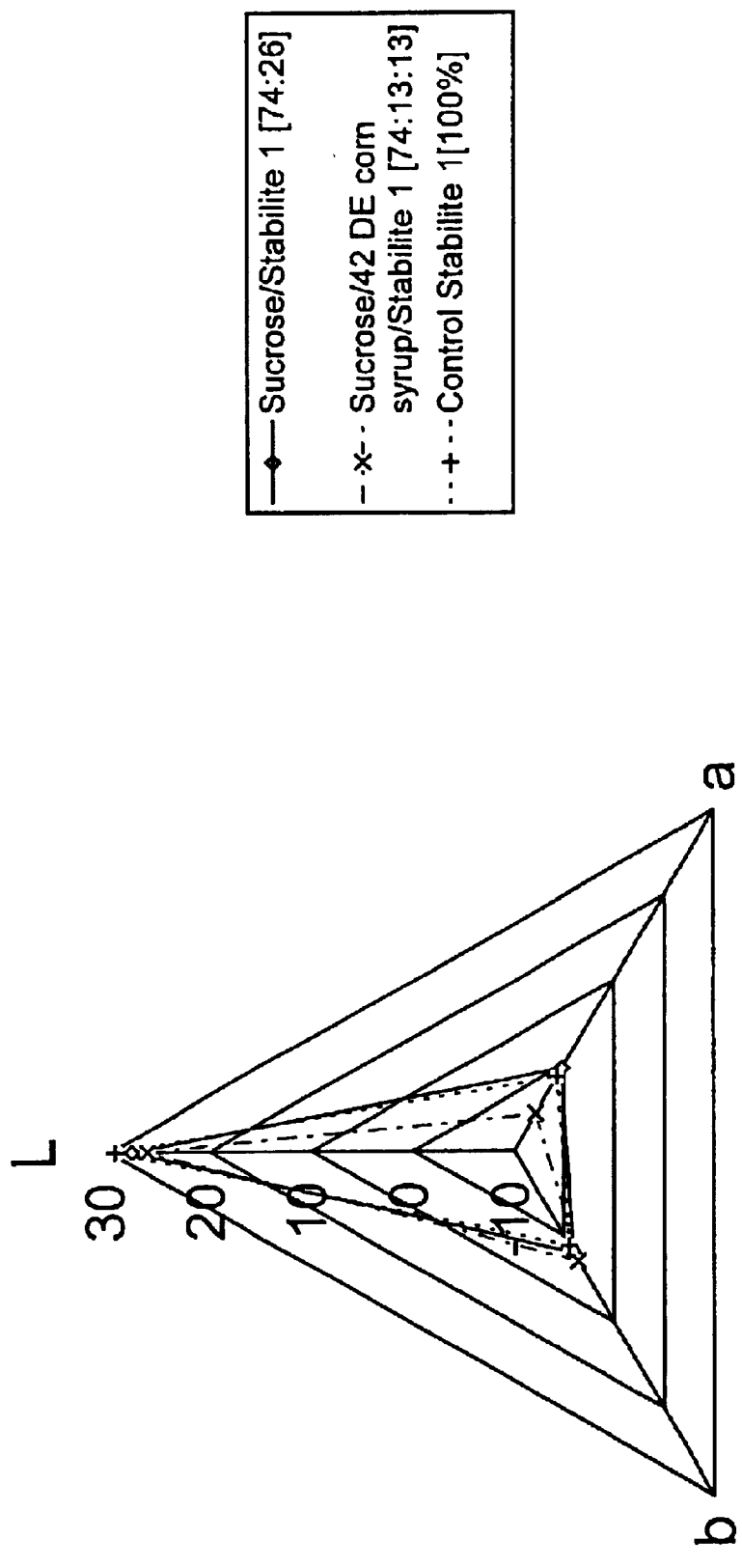

FIG. 6. Comparison of the index of whiteness values of hard-boiled candy samples [74:13:13, 74:26] on the L a b plane.

FIG. 7 Hunter Color Measurement Scale.

DETAILED DESCRIPTION OF THE PREFERRED EMBODIMENT(S)

A. General

1. Preparation of Hydrogenated Starch Hydrolysates

The invention relates to stable boiled candies having a high index of whiteness. The boiled candies are prepared using sucrose and HSH, and optionally, corn syrup. The preferred HSH of the present invention is STABILITE™ 1 (a product of SPI Polyols, Inc., New Castle, Del.). The characteristics of STABILITE™ 1 used in the present invention are described by Le in U.S. patent application Ser. No. 09/276,014 and are described below for convenience. The HSH described by Le contains the amounts of each kind of saccharide (differentiated by DPs) shown in Table 1. When about 30 to 70 weight percent of MALTISWEET™ 3145 (a product of SPI Polyols, Inc., New Castle, Del.) is mixed with about 70 to 30 weight percent of low-DE hydrogenated maltodextrins (having a DE from about 18 to about 25), or a mixture thereof, the resulting hydrogenated starch hydrolysate syrup is within the range of Formula A in Table 1. The low-DE maltodextrins employed by Le include the following three commercial products that are manufactured by the Grain Processing Corporation, of Muscatine, Iowa. These are:

1. MALTRIN M180 (approximate DE=18), having a theoretical molecular weight of 1000 and an average DP=6.2;

2. MALTRIN M200 (approximate DE=20), having a theoretical molecular weight of 1000 and an average DP=5.6; and 3. MALTRIN M250 (approximate DE=25), having a theoretical molecular weight of 1000 and an average DP=4.5;

The maltodextrins or corn syrups described in Le can be hydrogenated by conventional means, such as a hydrogenation process which employs a molybdenum promoted by Raney nickel catalyst. The molybdenum catalyst material, (type 3110) was obtained from Davidson Chemical Company, a division of W. R. Grace.

The weight percents of the various saccharides in the hydrogenated starch hydrolysate syrups are based on the solids content in the syrups, i.e., they are not based on the total weight of the syrup; the weight of the water is excluded.

TABLE 1

DP Characterization by HPLC Analysis of
Formulae A, B and C Hydrogenated Starch Hydrolysates

| DP | A wt.-% of syrup | B Preferred wt.-% of syrup | C Most Preferred wt.-% of syrup |
|---|---|---|---|
| 1 + unknown | <8 | 2.6–7.7 | 2.8–3.7 |
| 2 | <41 | 21.4–40.1 | 25.8–34.3 |
| 3 | <15 | 8.9–13.6 | 10.4–12.2 |
| 4–10 | <30 | 16.0–29.3 | 24.5–29.3 |
| 11 or more | 14–38 | 22.5–37.1 | 22.5–29.2 |

Le teaches the use of HSH (having the name "STABILITE 1" available from INNOVA LLC, a joint-venture of SPI Polyols, Inc., New Castle, Del. and Grain Processing Corp., Muscatine, Iowa) to make hard boiled candies. When the STABILITE 1 candies were compared to hard boiled candies prepared from conventional hydrogenated starch hydrolysate syrups (HYSTAR 3375 available from Lonza, now SPI Polyols, Inc., New Castle, Del. and RA 1000 available from Roquette Freres, Lestrem, France), the hard boiled candies formed from the STABILITE 1 HSH syrups were found to be significantly more stable at high temperatures, e.g., 65.6° C., and high moisture contents, e.g., 1 to 4 percent by weight, and absorb less water when stored under humid conditions at ambient temperature for extended periods. Le observed that the hard boiled candies produced from HSH syrups having a high weight percent of the hydrogenated maltodextrin component, e.g., 50 to 70 weight percent, of the total HSH syrup, exhibited the highest heat stability and lowest absorption of moisture when stored under humid conditions.

As described in Le, it was surprising that the hard boiled candies formed from this hydrogenated starch hydrolysate were significantly more stable at high temperatures and high water contents than the hard boiled candies that are formed from the other hydrogenated starch hydrolysate syrups that are presently on the market. Although applicants do not wish to be bound by any theory, it is believed that the increase in stability as well as the reduction in the amount of water absorbed can be attributed to the lower contents of DP=4 to 10 hydrogenated oligosaccharides, the lower contents of DP=1 hydrogenated monosaccharides, and/or the higher contents of DP≧11 hydrogenated polysaccharides greater than decasaccharides in the hydrogenated starch hydrolysates of the present invention.

The glass transition temperature ($T_g$) of hard boiled sweets or candies is lowered by the addition of water to the candy, e.g., through absorption from the surrounding environment. The absorbed water can solubilize the hydrogenated DP=1 to 3 saccharides. The hard boiled candies produced from the hydrogenated starch hydrolysate of Le contained relatively low amounts of hydrogenated DP=1 to 3 saccharides, which may contribute to a reduction in the absorption of moisture since these hydrogenated DP=1 to 3 saccharides are hygroscopic (especially sorbitol). Although applicants do not wish to be bound by any theory, it is believed that the hard boiled candies produced from the hydrogenated starch hydrolysates of Le demonstrate reduced water absorption in part because they contain relatively low levels of the hydrogenated DP=1 monosaccharide, such as sorbitol. Also present in the hydrogenated starch hydrolysate of Le is a relatively high amount of hydrogenated DP≧11 polysaccharides, which have low water solubilities due to their high branching. The less soluble hydrogenated DP≧11 polysaccharides may reduce the amount of water absorbed by the hard boiled candies under humid conditions. This reduces the likelihood of dissolving candies or 'cold flow' candies, which are sticky and sometimes deformable candies at ambient temperature. The higher hydrogenated DP≧11 polysaccharides also contribute to higher glass transition temperatures ($T_g$), which is the temperature at which, upon heating, a glassy and solid boiled candy or sweet softens and eventually becomes a syrupy liquid. A higher glass transition temperature is a beneficial property in a boiled hard candy because the candy will be a stable glassy material, e.g., a hard candy, over a broader useful temperature range.

One drawback with relatively high percentages of hydrogenated maltodextrins in the hydrogenated starch hydrolysate observed by Le is that the hydrogenated maltodextrins tend to increase the viscosity of the hydrogenated starch hydrolysate, probably due to the higher amounts of hydrogenated DP≧1 polysaccharides. This is why the amount of hydrogenated maltodextrin in the hydrogenated starch hydrolysate is usually not greater than 70 weight percent. In industrial environments, the viscosities of cooked hydrogenated starch hydrolysate syrups are preferably in the range of about 11,000 to 12,800 cps at 165.6° C. (330° F.). However, through the use of roping and stamping equipment of a type which would be known to one skilled in the art, it is possible to use hydrogenated starch hydrolysates which have higher viscosities to make boiled sweets.

The heat and moisture stability of hydrogenated starch hydrolysate hard boiled candy is dependent on the water content of the hard boiled candy and the water absorption under humid conditions at ambient temperature. When the water absorption rate of a hard boiled candy formed from a hydrogenated starch hydrolysate syrup under humid conditions at ambient temperature is high, the candy will partially dissolve or "cold flow" faster than a candy with a slower water absorption rate. This leads to sticky, and sometimes deformable, candies at ambient temperature, as described above. Moreover, a hydrogenated starch hydrolysate hard boiled candy that has a relatively high moisture content is more likely to melt at elevated temperatures during storage than a similar hydrogenated starch hydrolysate candy with a lower moisture content. This is because the glass transition temperature of the candy decreases as the water content of the candy increases. The hydrogenated starch hydrolysate hard boiled candies according to the present invention have higher glass transition temperatures, higher heat stabilities at high moisture contents, e.g., 1 to 4 percent by weight, and lower moisture absorption when stored under humid conditions for extended periods than the commercial hydrogenated starch hydrolysate hard boiled candies that are presently on the market.

The method of making the hydrogenated starch hydrolysate syrups according to Le involves blending MALTISWEET™ 3145 with various types of hydrogenated low DE maltodextrins or low DE corn syrups, for example, M180, M200 and M250, as described above. The blend of MALTISWEET™ 3145 and hydrogenated low DE maltodextrins or low DE corn syrups is heated to a temperature of about 171° C., without pulling a vacuum. Once the blend reaches 171° C., it is poured onto a surface to cool. The blend at this point is molten and highly viscous, e.g., between about 11,000 and 16,000 cps, and is spread or scraped on the cooling surface to a thickness of about 0.5 to 1.0 inch. The molten blend is gradually cooled at ambient room temperature to a temperature of about 93–95° C. at which time the cooled blend is shaped into the final candy shape. Secondary ingredients such as flavorants, colorants, intense sweeteners, fillers, acidulants, plant extracts, vitamins, pharmaceutical active ingredients, and the like, can be added to either the molten blend or the cooled blend, i.e., at about 93–95° C., before the final shaping step. The DP of the final HSH syrup is determined by HPLC.

Table 2 below shows the breakdown of the components in the preferred HSH syrups of the present invention (labeled as Formulae D, E and F) which components are identified by their DP numbers in weight percent based on the solids content of the HSH syrup. Table 2 also shows the breakdown for two commercial products (labeled as Formulae X and Y) that are presently on the market.

TABLE 2

DP Characterization by HPLC Analysis of
Formulae D, E and F and Comparative Examples X and Y

| DP | D 50/50 hydrogenated M180/ Maltisweet™ 3145 (wt.-%) | E 50/50 hydrogenated M200/ Maltisweet™ 3145 (wt.-%) | F 70/30 hydrogenated M250/ Maltisweet™ 3145 (wt.-%) | X Lonza HYSTAR 3375 (wt.-%) | Y Roquette RA1000 (wt.-%) |
|---|---|---|---|---|---|
| DP = 1 | 2.89 | 3.2 | 7.65 | 14.32 | 13.44 |
| DP = 2 | 32.91 | 34.26 | 25.82 | 19.3 | 9.71 |
| DP = 3 | 10.55 | 12.17 | 10.42 | 12.07 | 9.14 |
| DP = 4 to 10 | 24.5 | 27.84 | 29.22 | 37.36 | 40.55 |
| DP ≧ 11 | 29.18 | 22.54 | 26.9 | 16.96 | 26.84 |

Each blend of hydrogenated maltodextrin with MALTISWEET™ 3145 (D, E or F) provided a hydrogenated starch hydrolysate syrup which produced a hard boiled candy that had a higher heat stability, e.g., at higher water contents, and absorbed less amounts of water when stored under humid conditions at 25° C. when compared to hard boiled candies produced from commercial products (X and Y). Le tested the water absorption of the hydrogenated starch hydrolysate hard boiled candies at 30, 50, and 75 percent relative humidity chambers at 25° C.

It is preferred to use the hydrogenated M180, i.e., as the hydrogenated low DE maltodextrin, in the hydrogenated starch hydrolysate mixture because of its lower amounts of reducing sugars and dextrose. Moreover, Le teaches that the hydrogenated starch hydrolysate according to the specification can also be blended with a crystallizable polyol, such as lactitol, isomalt, maltitol, mannitol, crythritol, sorbitol, xylitol or polydextrose at various ratios and still provide hard boiled candies that have high stabilities at elevated temperature and water contents, e.g., 1–4 percent by weight water, and lower water absorption when stored under humid, conditions for extended periods. However, one of the advantages provided by the HSH as described in Le is that there is no need to add a crystallizable polyol. The hydrogenated starch hydrolysate according to Le contains only non-crystallizable polyol forms, i.e., the product only forms an amorphous glass when solidified, which avoids any turning (crystallization from the surface to the center of the sweet) or graining (crystallization from the center to the surface of the sweet) problems and promotes an attractive glassy appearance.

The hard boiled candies formed from the hydrogenated starch hydrolysates according to Le also exhibit higher glass transition temperatures than hard boiled candies formed from conventional hydrogenated starch hydrolysates. For example, six hard boiled candies formed from hydrogenated starch hydrolysates according to the present invention with various compositions were tested to determine their glass transition temperatures. The results of those tests are summarized in Table 3. All six samples fell within the formula A set forth in Table 1. Three of the samples fell within the formula B set forth in Table 1 and two of the samples fell within the formula C set forth in Table 1. It should be noted that the ranges for the various glass transition temperatures set forth in Table 3 should be considered as exemplary ranges and not as limiting ranges because the six samples tested did not completely cover the possible compositional ranges of formulae A, B and C, i.e., the lowest and highest amounts for each component were not tested. However, from the data obtained from the six samples that were tested, it can be determined that the hard boiled candies produced from the hydrogenated starch hydrolysate of Le will have an onset glass transition temperature of at least about 49° C., a mid-point glass transition temperature of at least about 51° C. and a final point glass transition temperature of at least about 54° C. The hard boiled candies produced from the preferred hydrogenated starch hydrolysates of Le have onset glass transition temperatures that are at least 55° C., preferably at least 59° C., most preferably at least 67° C.; midpoint glass transition temperatures that are at least 59° C., preferably at least 64° C., most preferably at least 70° C.; and final point glass transition temperatures that are at least 67° C., preferably at least 74° C., most preferably at least 78° C. All of the various glass transition temperatures of the six samples that were tested were measured using hard boiled candy samples that had a water content of from one to two weight percent.

TABLE 3

Glass Transition Temperature ($T_g$) Profile

| Sample | @ onset $T_g$ (° C.) | @ midpoint $T_g$ (° C.) | @ final point $T_g$ (° C.) |
|---|---|---|---|
| Formula A | 49.1–67.8 | 51.4–85.7 | 54.4–91.4 |
| Formula B | 55.0–67.8 | 58.9–70.2 | 67.2–77.8 |
| Formula C | 58.6–63.6 | 64.4–65.1 | 73.8–74.1 |

The higher glass transition temperatures of the hard boiled candies that are produced from the hydrogenated starch hydrolysates of Le result in candies that are stable at higher temperatures. Further, since the hard boiled candies of the present invention have a higher glass transition temperature at a given water content, i.e., the water content in the candy, than the hard boiled HSH candies that are presently on the market, the hard boiled candies of the present invention will maintain their stability at normal ambient room temperature at a significantly higher water content than the hard boiled HSH candies that are presently on the market.

2. The Use of STABILITE™ 1 to Make Boiled Candy

The boiled candies prepared according to the present invention are stable at high temperatures, e.g., from above 25° C. to about 37.8° C., and high water contents, e.g., about 1 to 4 weight percent. The candies also absorb less water under humid conditions compared to hard-boiled candies that are currently on the market. Additionally, the boiled candies have a higher index of whiteness, compared to the hard-boiled candies that are currently on the market.

It is a preferred embodiment of the present invention that the HSH used to prepare the hard-boiled candies be STABILITE 1. It is also a preferred embodiment of the invention that the hard-boiled candies contain from about 10 to about 50 weight percent STABILITE 1. The upper limit of HSH used in the preparation of hard-boiled candies is limited by the higher cost of HSH compared to sucrose. The inventor believes that hard-boiled candies can be prepared with greater than 50 weight percent STABILITE 1, however, the cost of the products would make the product economically undesirable. It is a more preferred embodiment of the present invention that the hard-boiled candies contain from about 13 to about 20 weight percent STABILITE 1. It is also a preferred embodiment that the hard-boiled candies contain from about 50 to about 90 weight percent sucrose. It is an optional embodiment that the hard-boiled candies contain from about 10 to about 30 weight percent 42DE corn syrup. The amounts of STABILITE 1 and/or corn syrup will vary depending on the final hardness desired in the hard-boiled candy because the hardness of the candy decreases with increasing amounts of STABILITE 1 and/or corn syrup.

The boiled candies according to the present invention are prepared by open cooking sucrose and STABILITE™ 1 to about 160° C. for about 30 to 40 minutes. The sucrose should be of a type typically used to make hard-boiled sweets. It is a preferred embodiment of the present invention that the cooking process be completed without using a vacuum, i.e., at ambient atmospheric pressure. Once the syrup has been adequately cooked, the hot syrup is removed from heat, and cooled to about 143° C. After the syrup has cooled to 143° C., the syrup is transferred to molds.

The whiteness of the finished hard-boiled candies is measured using the Gardner's HANDY-COLOR™ Model No. 9200. It is a preferred embodiment of the present invention that the finished hard-boiled candies have an "L" value higher than 26.5, an "a" value greater than –1.0, and a "b" value less than 2.2. It is a further preferred embodiment of the present invention that the "L" value be from about 27.5 to 29.5, the "a" value of about –0.5 to –1.5, and the "b" value of less than about 2.2. It is a most-preferred embodiment of the present invention that the "L", "a", and "b" values of the hard-boiled candies equal those of 100 percent STABILITE 1, which can be found in Table 5 below.

B. PREPARATION OF EXAMPLES

TABLE 4

Composition of Examples

| | Sucrose (g) | HSH syrup @ 75% solids (g) | 42DE Corn Syrup @ 75% solids (g) |
|---|---|---|---|
| Example 1 | 80 | 20 | none |
| Example 2 | 80 | none | 20 |
| Example 3 | 74 | none | 26 |
| Example 4 | 74 | 13 | 13 |

Example 1(80 g Sucrose/20 g HSH)

Preparation 80 grams of a sucrose syrup at 75 percent solids and 20 grams of an HSH syrup, (STABILITE™ 1 from SPI Polyols, New Castle, Del., Lot No. A8103) at 75 percent solids were poured into a 250 ml PYREX® beaker and mixed together to form a homogenous solution using a stainless steel spatula. In the beaker, the aqueous solution was heated on a hot plate (Corning Laboratory Stirrer/Hot Plate Model PC 320, Corning, Inc., Corning, N.Y.) at the "High" setting. The solution was heated to a temperature of 160° C. (measured with a thermometer, Type K, Serial No. C07094, Control Company, Friendswood, Tex.) for a duration of about 30 to 45 minutes while being open to the atmosphere. With the solution at a temperature of 160° C., the hot syrup was removed from the hot plate, cooled to 143° C., and then slowly poured into molds. The molded candies had a thickness of about 0.40 cm. After cooling the candies for about 20 minutes at ambient room temperature and less than 40 percent relative humidity, the candies were demolded. For stability testing, the candies were subjected to 75 percent relative humidity in a chamber at both 25° C. and 37.8° C. for a period of two weeks.

Example 2(80 g Sucrose/20 g 42DE Corn Syrup)

Preparation 80 grams of a sucrose syrup at 75 percent solids and 20 grams of 42 DE corn syrup (Staley 1300, Lot No. D28D0011P, A. E. Staley, Co., Decatur, Ill.) at 75 percent solids were poured into a 250 ml PYREX® beaker and mixed together to form a homogenous solution using a stainless steel spatula. In the beaker, the aqueous solution was heated on a hot plate (Corning Laboratory Stirrer/Hot Plate Model PC 320, Corning, Inc., Corning, N.Y.) at the "High" setting. The solution was heated to a temperature of 160° C. (measured with a thermometer, Type K, Serial No. C07094, Control Company, Friendswood, Tex.) for a duration of about 30 to 45 minutes while being open to the atmosphere. With the solution at a temperature of 160° C., the hot syrup was removed from the hot plate, cooled to 143° C., and then slowly poured into molds. The molded candies had a thickness of about 0.40 cm. After cooling the candies for about 20 minutes at ambient room temperature and less than 40 percent relative humidity, the candies were demolded. For stability testing, the candies were subjected to 75 percent relative humidity in a chamber at both 25° C. and 37.8° C. for a period of two weeks.

Example 3(74 g Sucrose/26 g 42DE Corn Syrup)

Preparation 74 grams of a sucrose syrup at 75 percent solids and 26 grams of 42 DE corn syrup (Staley 1300, Lot No. D28D0011P, A. E. Staley, Co., Decatur, Ill.) at 75 percent solids were poured into a 250 ml PYREX® beaker and mixed together to form a homogenous solution using a stainless steel spatula. In the beaker, the aqueous solution was heated on a hot plate (Corning Laboratory Stirrer/Hot Plate Model PC 320, Corning, Inc., Corning, N.Y.) at the "High" setting. The solution was heated to a temperature of 160° C. (measured with a thermometer, Type K, Serial No. C07094, Control Company, Friendswood, Tex.) for a duration of about 30 to 45 minutes while being open to the atmosphere. With the solution at a temperature of 160° C., the hot syrup was removed from the hot plate, cooled to 143° C., and then slowly poured into molds. The molded candies had a thickness of about 0.40 cm. After cooling the candies for about 20 minutes at ambient room temperature and less than 40 percent relative humidity, the candies were demolded. For stability testing, the candies were subjected to 75 percent relative humidity in a chamber at both 25° C. and 37.8° C. for a period of ten days.

Example 4(74 g Sucrose/13 g HSH/13 g 42DE Corn Syrup)

Preparation 74 grams of a sucrose syrup at 75 percent solids and 13 grams of an HSH syrup, (STABILITE™ 1 from SPI Polyols, New Castle, Del., lot no. A8103) at 75 percent solids, and 13 grams of 42 DE corn syrup (Staley 1300, Lot No. D28D0011P, A. E. Staley, Co., Decatur, Ill.) at 75 percent solids were poured into a 250 ml PYREX® beaker and mixed together to form a homogenous solution using a stainless steel spatula. In the beaker, the aqueous solution was heated on a hot plate (Corning Laboratory Stirrer/Hot Plate Model PC 320, Corning, Inc., Corning, N.Y.) at the "High" setting. The solution was heated to a temperature of 160° C. (measured with a thermometer, Type K, Serial No. C07094, Control Company, Friendswood, Tex.) for a duration of about 30 to 45 minutes while being open to the atmosphere. With the solution at a temperature of 160° C., the hot syrup was removed from the hot plate, cooled to 143° C., and then slowly poured into molds. The molded candies had a thickness of about 0.40 cm. After cooling the candies for about 20 minutes at ambient room temperature and less than 40 percent relative humidity, the candies were demolded. For stability testing, the candies were subjected to 75 percent relative humidity in a chamber at both 25° C. and 37.8° C. for a period of ten days.

C. Analysis of Candies From Examples

1. Stability (a) Recrystallization

The hard-boiled candy as prepared in both Example 1 and Example 2 were observed to recrystallize when stored in the 75 percent relative humidity chamber at both 25° C. and 37.8° C. after two weeks time. Example 3 and Example 4 were observed to recrystallize when stored in the 75 percent relative humidity chamber at both 25° C. and 37.8° C. after ten days time.

While, it is well-known in the art that both 42 DE corn syrup and HSH will retard the crystallization of sucrose when used at high levels, i.e., amounts ranging from 40 to 60 weight percent of the syrup, the addition of HSH or corn syrups in the amounts used in the above Examples did not significantly retard the crystallization of the sucrose.

(b) Moisture Absorption

The moisture absorption of the Examples was determine by measuring the percentage of weight gained for the candies at 75 percent relative humidity at both 25° C. and 37.8° C. FIG. 1 shows the plot of the percentage of weight gained over time for Examples 1 and 2 at 25° C. and 75 percent relative humidity. In FIG. 1, the hard-boiled candy produced in Example 1 was observed to have absorbed substantially less moisture than hard-boiled candy as prepared in Example 2. After 5 days, Example 1 gained about 1.0 percent in weight, while Example 2 gained about 3.0 percent. After 14 days, Example 1 gained only about 1.7 percent in weight, while Example 2 gained about 4.6 percent.

FIG. 2 shows the plot of the percentage of weight gained over time for Examples 1 and 2 at 37.8° C. and 75 percent relative humidity. In FIG. 2, Example 1 can be seen to have absorbed substantially less moisture than Example 2. After 5 days, Example 1 gained about 1.6 percent in weight, while Example 2 gained about 4.0 percent. After 14 days, Example 1 gained about 3.3 percent in weight, while Example 2 gained about 7.8 percent in weight.

FIG. 3 shows the plot of the percentage of weight gained over time for Examples 1, 2, 3, and 4 at 25° C. and 75 percent relative humidity. In FIG. 3, Example 4 can be seen to have absorbed substantially less moisture than Examples 2 and 3. After 5 days, Example 4 gained about 3.0 percent in weight, Example 2 gained about 4.1 percent, and Example 3 gained about 4.8 percent. After 10 days, Example 4 gained about 4.2 percent in weight, Example 2 gained about 5.3 percent in weight, and Example 3 gained about 6.4 percent in weight.

FIG. 4 shows the plot of the percentage of weight gained over time for Examples 1, 2, 3, and 4 at 37.8° C. and 75 percent relative humidity. In FIG. 4, Example 4 can be seen to have absorbed less moisture than Examples 2 and 3. After 5 days, Example 4 gained about 4.4 percent in weight, Example 2 gained about 6.0 percent, and Example 3 gained about 6.8 percent. After 10 days, Example 4 gained about 7.9 percent in weight, Example 2 gained about 8.8 percent in weight, and Example 3 gained about 10.8 percent in weight.

2. Whiteness

The hard-boiled candies prepared in Example 1 were observed to have an objectively higher index of whiteness compared to the hard-boiled candy as prepared in Example 2. Table 2 lists the index of whiteness values of the hard-boiled candies prepared in the Examples as measured in the L*a*b* plane. FIG. 5 shows the plot of Example 1, Example 2, and a control of 100 percent STABILITE 1 HSH on the L*a*b* plane.

The hard-boiled candies containing sucrose, HSH, and 42 DE corn syrup prepared in Example 4 were observed to have a higher index of whiteness on the L*a*b* plane compared to the hard-boiled candies prepared in Example 2, which contained only sucrose and corn syrup. FIG. 6 shows the plot of Example 3, Example 4, and a control of 100 percent STABILITE 1 HSH on the L*a*b* plane.

As indicated in Table 5 below, Example 1 had a substantially higher index of whiteness, represented by a higher "L" values and less negative "a" values, than Examples 2 and 3, which do not have STABILITE 1. The combination of STABILITE 1, sucrose, and 42DE corn syrup, as show in Example 4, also exhibited higher whiteness than both Examples 2 and 3. Therefore, it can be concluded that the addition of STABILITE 1, to sucrose produces a hard candy with a measurably higher index of whiteness than products made with sucrose and 42DE corn syrup. Additionally, HSH added to a product consisting of sucrose and 42DE corn syrup also has increased whiteness compared to sucrose and 42DE corn syrup alone. Example 1, which contains 80 weight percent sucrose and 20 weight percent STABILITE 1, exhibited "L", "a", and "b" values closest to the control sample of 100 percent STABILITE 1.

TABLE 5

Whiteness Values using Gardner's HANDY-COLOR ™

| | L | a | b |
|---|---|---|---|
| Example 1 (80:20HSH) | 28.91 | −0.45 | 2.08 |
| Example 2 (80:20CS) | 24.35 | −7.28 | 3.54 |
| Example 3 (74:26CS) | 26.27 | −5.66 | 2.9 |
| Example 4 (74:13CS:13HSH) | 27.83 | −0.4 | 1.91 |
| Control (100% HSH) | 29.48 | −1.44 | 1.02 |

While the invention has been particularly shown and described with reference to preferred embodiments thereof, it will be understood by those skilled in the art that various changes in form and details may be made without departing from the spirit and scope of the invention as defined in the appended claims.

I claim:

1. A hard-boiled candy comprising sucrose and hydrogenated starch hydrolysates (HSH), wherein said HSH is present in amounts up to 50 wt %, further wherein said HSH has the following degree of polymerization (DP) distribution determined by HPLC analysis:
   less than 8 wt % of the HSH has a DP=1 or unknown;
   less than 41 wt % of the FISH has a DP=2;
   less than 15 wt % of the HSH has a DP=3;
   less than 30 wt % of the HSH has a DP=4 to 10; and
   from 14 to 38 wt % of the HSH has a DP of 11 or more.

2. The hard-boiled candy of claim 1 comprising from about 13 wt % to about 20 wt % of said HSH.

3. The hard-boiled candy of claim 2 further comprising up from about 10 to about 30 wt % 42DE corn syrup.

4. The hard-boiled candy of claim 1, wherein said candy is produced without using a vacuum, that is, the candy is cooked at ambient atmospheric pressure.

5. The hard-boiled candy of claim 1, wherein the candy, as measured with a Gardner's HANDY-COLOR™ Model No. 9200 has an "L" value higher than 26.5, an "a" value greater than −1.0, and a "b" value less than 2.2.

6. The hard-boiled candy of claim 5, wherein the candy has an "L" value from about 27.5 to 29.5, an "a" value of about −0.5 to −1.5, and a "b" value of less than about 2.2.

7. A hard-boiled candy comprising sucrose and hydrogenated starch hydrolysates (HSH), wherein said HSH is present in amounts up, to 50 wt %, further wherein said HSH has the following degree of polymerization (DP) distribution determined by HPLC analysis:
  from 2.6 to 7.7 wt % of the HSH has a DP=1 or unknown;
  from 21.4 to 40.1 wt % of the HSH has a DP=2;
  from 8.9 to 13.6 wt % of the HSH has a DP=;
  from 16.0 to 29.3 wt % of the HSH has a DP=4 to 10; and
  from 22.5 to 37.1 wt % of the HSH has a DP of 11 or more.

8. The hard-boiled candy of claim 7 comprising from about 13 wt % to about 20 wt % of said HSH.

9. The hard-boiled candy of claim 8 further comprising up from about 10 to about 30 wt % 42DE corn syrup.

10. The hard-boiled candy of claim 7, wherein said candy is produced without using a vacuum, that is, the candy is cooked at ambient atmospheric pressure.

11. The hard-boiled candy of claim 7, wherein the candy, as measured with a Gardner's HANDY-COLOR™ Model No. 9200 has an "L" value higher than 26.5, an "a" value greater than −1.0, and a "b" value less than 2.2.

12. The hard-boiled candy of claim 11, wherein the candy has an "L" value from about 27.5 to 29.5, an "a" value of about −0.5 to −1.5, and a "b" value of less than about 2.2.

13. A hard-boiled candy comprising sucrose and hydrogenated starch hydrolysates (HSH), wherein said HSH is present in amounts up to 50 wt %, further wherein said HSH has the following degree of polymerization (DP) distribution determined by HPLC analysis:
  from 2.8 to 3.7 wt % of the HSH has a DP=1 or unknown;
  from 25.8 to 34.3wt % of the HSH has a DP=2;
  from 10.4 to 12.2 wt % of the HSH has a DP=3;
  from 24.5 to 29.3 wt % of the HSH has a DP=4 to 10; and
  from 22.5 to 29.2 wt % of the HSH has a DP of 11 or more.

14. The hard-boiled candy of claim 13 comprising from about 13 wt % to about 20 wt % of said HSH.

15. The hard-boiled candy of claim 14 further comprising up from about 10 to about 30 wt % 42DE corn syrup.

16. The hard-boiled candy of claim 13, wherein said candy is produced without using a vacuum, that is, the candy is cooked at ambient atmospheric pressure.

17. The hard-boiled candy of claim 13, wherein the candy, as measured with a Gardner's HANDY-COLOR™ Model No. 9200 has an "L" value higher than 26.5, an "a" value greater than −1.0, and a "b" value less than 2.2.

18. The hard-boiled candy of claim 17, wherein the candy has an "L" value from about 27.5 to 29.5, an "a" value of about −0.5 to −1.5, and a "b" value of less than about 2.2.

* * * * *

UNITED STATES PATENT AND TRADEMARK OFFICE
CERTIFICATE OF CORRECTION

PATENT NO. : 7,026,008 B2  
APPLICATION NO. : 10/243300  
DATED : April 11, 2006  
INVENTOR(S) : Anh S. Le Page 1 of 1

It is certified that error appears in the above-identified patent and that said Letters Patent is hereby corrected as shown below:

On the TITLE Page:

Item (75) Inventor, "Anh Si Le, Houston, TX (US)" should read -- Anh Si Le, Geveva, Switzerland --

In the Claims:

In Claim 1, at column 14, line 50, "less than 41 wt% of the FISH has a DP=2;" should read -- less than 41 wt % of the HSH has a DP=2; --

In Claim 3, at column 14, line 56, "The hard-boiled candy of claim 2 further comprising up" should read -- The hard-boiled candy of claim 2 further comprising --

In Claim 7, at column 15, line 9, "from 8.9 to 13.6 wt % of the HSH has a DP=;" should read -- from 8.9 to 13.6 wt % of the HSH has a DP=3;--

In Claim 9, at column 15, line 15, "The hard-boiled candy of claim 8 further comprising up" should read -- The hard-boiled candy of claim 8 further comprising --

Signed and Sealed this

Sixteenth Day of January, 2007

JON W. DUDAS  
*Director of the United States Patent and Trademark Office*